United States Patent Office 2,970,086
Patented Jan. 31, 1961

2,970,086

METHOD OF MAKING DEXTROSE USING PURIFIED AMYLOGLUCOSIDASE

Ralph W. Kerr, Riverside, Ill., assignor to Corn Products Company, a corporation of Delaware No Drawing. Filed Dec. 30, 1957, Ser. No. 705,819

3 Claims. (Cl. 195—66)

This invention relates to a new process for hydrolyzing starch with enzymes wherein the yield of dextrose in the hydrolyzate is increased over prior art processes.

The main object of this invention is to provide an improved method for producing dextrose, or dextrose-bearing syrups, in processes involving the enzymatic hydrolysis of starch, or starch products, by means of amyloglucosidase containing preparations. The primary improvements which result are starch hydrolyzates which contain substantially less undesirable components, or impurities, that add to the burden of refining than are in starch hydrolyzates obtained by enzymatic processes of the prior art, and, in extended hydrolyses, greater potential yields of dextrose in hydrolyzates and greater actual yield of dextrose when the hydrolyzates are refined, concentrated, and crystallized, and the crystallized dextrose is separated from the mother liquors than are obtained from hydrolyzates produced by processes of the prior art. Accordingly, a more specific object of this invention is to provide a commercial process for the production of crystalline dextrose by enzymatic hydrolysis, which will give a higher yield of the sugar than is obtained from processes of the prior art. Other objects will appear hereinafter.

The existence of an enzyme which would hydrolyze starch molecules, or acid converted starch molecules, directly to the monomer, dextrose, has been recognized for at least 15 years.

As early as 1941, Kerr and Schink (Ind. Eng. Chem. 33, 1418 (1941 and later ibid. 34, 1232 (1942))) pointed out the presence of an alpha-glucosidase, in certain fungal extracts, which appeared to break away dextrose units directly from the large polysaccharide molecules in starch prehydrolyzed with acid and that there appeared to be no limit to the action short of complete hydrolysis to dextrose. Although there was disagreement with their findings, this view is now accepted.

During the interval of these early investigations, this hypothetical enzyme has been called by various names by different investigators. It has been called alpha-glucosidase, amyloglucosidase, gluc-amylase, starch-glucogenase and maltase. The last mentioned name was used by some very early investigators on the assumption, now shown to be erroneous, that the enzyme which produces glucose directly from starch was no different from a previously known enzyme called maltase, which produces dextrose from maltose, but is substrate specific for the disaccharide. Hereinafter, this starch hydrolyzing enzyme will be referred to as amyloglucosidase.

This enzyme occurs in aqueous extracts, or culture filtrates of microorganisms, particularly the fungi. Certain strains of A. niger, for example, are a very good source. Naturally, other enzymes from the living cells occur in these extracts also and separation of the amyloglucosidase, even from other carbohydrases, such as the alpha-amylases, transglucosidases and limit dextrinases has until recently presented an insurmountable problem. Indeed, amyloglucosidase is one of a very few remaining carbohydrases that has not as yet been separated in a form sufficiently pure to be crystallized.

In spite of the glowing predictions of some of the early workers in this field that there should be no limit to the hydrolysis of starch, short of complete hydrolysis to dextrose, and that an enzymatic dextrose process should be greatly superior to the conventional acid hydrolysis process in respect to yield of dextrose sugar and in refining problems, data from prior art processes for enzymatically produced dextrose have failed to fulfill these hopes. There have appeared to be problems in the enzymatic process analogous to the acid hydrolysis.

Problems involved in the conventional acid process have been outlined by Kerr (Chemistry and Industry of Starch, Second Edition, Chaper XIV). There is in the acid hydrolysis process the problem of incomplete hydrolysis, due to the greater resistance of the anomalous 1-6 alpha-glucoside linkage in starch to hydrolysis. There is the synthetic action, or reversion, induced by acid whereby dextrose or lower sugars recombine into more acid stable dimers or polymers. These two results alone not only appreciably detract from the potential yield of dextrose in the hydrolyzate but, on crystallization and separation of dextrose from these hydrolyzates, they drastically reduce the actual yield of the sugar obtained (Chem. and Ind. of Starch, p. 385). When starch is hydrolyzed by fungal extracts, inspection of the hydrolyzates shows the presence of substantial quantities of dimers and polymers of dextrose with anomalous linkages, indicating either incomplete hydrolysis or synthetic action, or both.

In the acid hydrolysis process there are "destructive" reactions in which protein or nitrogenous impurities play a part. These reactions and the presence of salts add to the burden of refining the hydrolyzate and contribute to reduced yields of finished sugar. Obviously, when extraneous protein and salts are deliberately added to starch liquors by way of fungal extracts or culture filtrates, it is not surprising that these aforesaid problems in refining and further reduced dextrose yields should be aggravated in the enzymic processes of the prior art.

Several U.S. patents have been granted recently on improved processes of hydrolyzing starch with enzymes; 2,305,168; 2,531,999; 2,583,451; 2,717,852.

When enzymatic dextrose processes of the prior art are employed to hydrolyze starch or starch products, hydrolyzates are obtained which contain no more than about 85 percent dextrose, dry basis, even under optimal operating conditions. Further analysis of these hydrolyzates for total sugars, or reducing substances, as by the well known Lane and Eynon modified Fehling's test, and calculating the result as dextrose equivalent (D.E.) discloses that there is an additional 5 percent or more of nondextrose sugars present and a balance of higher polysaccharides and noncarbohydrate impurities to total 100 percent.

When these hydrolyzates are refined by passing over bone char, filtration and concentration, and are crystallized by orthodox procedures used in the art, yields of crystalline dextrose no higher than about 60 percent, dry basis are obtained. This is substantially the same yield as is obtained in an orthodox acid conversion of starch and using comparable refining and crystallizing procedures. In both cases, the nondextrose solids present in the hydrolyzates have prevented the crystallization of some 25 to 30 percent of dextrose (calculated on a dry basis) known to be present in the hydrolyzate.

When the mother liquors from the enzymatic processes are reconcentrated and recrystallized, a yield of second grade sugar amounting to as high as 20 percent, dry basis, of the original hydrolyzates solids may be realized. Thus, a total yield of sugar as high as 80 percent is obtained. When mother liquors from the acid conversion process are refined, rehydrolyzed by acid, concentrated and crystallized, also an additional yield of second grade sugar as high as 20 percent may be obtained to give a total yield of 80 percent of first and second grade sugar.

Obviously, reconversions, further refining and recrystallizations may be repeated many times to increase the yield above 80 percent in both acid and enzymatic processes but the proportionate cost increases with each repetition.

From a critical examination of the prior art, it is evident that these workers believed that the disappointingly low yield of dextrose found in starch hydrolyzates by enzymic conversion, and that actual yields of crystalline product no higher than in comparable acid hydrolysis processes, were due to one, or to a combination of two or more of the following:

(1) That the dextrose producing enzyme, per se, was incapable of carrying the conversion to any higher level; that is, that there was a "limit of conversion" analogous to the limit obtained with the maltose producing enzyme, beta-amylase.

(2) That the "limit of conversion" varied with the source of the glucosidase and that higher dextrose yields could be obtained, possibly, by finding a fungal extract with a higher "conversion limit."

(3) That the dextrose producing enzyme was a maltase substrate specific for maltose or lower polysaccharide, and accordingly, the dextrose yield from starch would depend entirely on the presence in the fungal extracts of other enzymes known to produce maltose, e.g., alpha-amylase.

(4) That because of conditions necessarily applied in practice for reasons of economy, or for some other reason, in one or more stages of the production process for making dextrose, no higher yields of dextrose could be obtained than those actually found. Such conditions contemplated were, for example, concentration of starch or starch product used for hydrolysis by the enzyme; the degree or manner in which the starch was pretreated prior to enzyme hydrolysis, as for instance, with acid; the pH, temperature and other variables of the enzymic hydrolysis and the manner in which the fermentation was carried out to produce the fungal extract.

(5) That although one function of the amyloglucosidase molecule is to hydrolyze starch to dextrose, this action was as a transferase and accordingly, this same enzyme molecule might be expected to exhibit transglucosidase activity as a secondary function, which would be anticipated to reduce the dextrose yield.

Any and all of these and similar theories are in marked contrast to the discoveries which underlie the present invention.

I have found that the amyloglucosidase molecule possesses only one function which is to hydrolyze the linkages of starch molecules so as to produce dextrose and that all other enzymes present in fungal extracts (or all other enzymic activity) may be separated from this amyloglucosidase molecule. I have found that amyloglucosidase attacks the nonreducing terminal ends of starch molecules, splits off dextrose directly from these terminals and proceeds thus along the starch molecule until it is substantially completely hydrolyzed to dextrose. Lesser yields in starch hydrolyzates obtained by use of crude fungal extracts containing the amyloglucosidase are, accordingly, due to other, interfering enzymes, including transglucosidases, which give final products other than dextrose. When starch or starch products are hydrolyzed by "purified" extracts which contain only amyloglucosidase activity and yields short of 100 percent are obtained and hydrolyzates so produced still present certain refining problems, this result is due primarily to extraneous protein and salts that are added with the "purified" extract and eventually become a part of the hydrolyzate.

Accordingly, this invention consists of an improved, practical, enzymatic process for producing dextrose in exceptionally high yield from starch and starch products, in which an amyloglucosidase containing preparation is used that has been pretreated to purify it from interfering enzymes, including, for example, transglucosidase, which act to produce sugars other than dextrose. Preferably, also, the amyloglucosidase should be purified from extraneous protein and salts which, if they become a part of the hydrolyzate liquors, add to the burden of refining these liquors to produce, finally, the pure crystalline sugar, dextrose.

My purification treatment of the enzyme consists in treating a solution or suspension containing the enzyme with a small amount of a hydrous, insoluble synthetic magnesium silicate absorbent, such as that sold under the trademark Magnesol. It is based upon the very surprising discovery, that this synthetic magnesium silicate very effectively removes by adsorption from crude fungal culture liquors, enzymes particularly transglucosidase, and other impurities which interfere with the enzymatic production of dextrose from starch, but does not remove the desired, dextrose producing enzyme, amyloglucosidase. It is preferred, although not necessary, to first remove any insoluble solids present in the suspension of the enzyme preparation. The enzyme preparation may consist of the whole culture liquor from submerged growth of an amylase-producing microorganism; the clarified liquor obtained from the submerged culture; a suspension of a dried or partially dried preparation which may contain bran, starch or various other adulterants used in standardizing the amylase preparation; or a solution of completely soluble enzyme preparation. In general the treatment of the enzyme preparation should be carried out at a pH at which the desired enzyme is stable, i.e., an acidic pH. Since the synthetic magnesium silicate alters the pH to the alkaline side, it is desirable to adjust the pH to the acid side and then carry out the treatment under acidic conditions. Following the addition of absorbent to and adjustment of the pH of the solution or suspension of the enzyme preparation, the mixture is agitated and then the solid and liquid phases are separated. The transglucosidase activity of the culture liquor, extraneous protein, colored bodies and other impurities are retained in the solid phase while the desirable carbohydrases particularly amyloglucosidase, remain in the liquid phase.

In general, I have found that most crude fungal extracts are most effectively purified in respect to amyloglucosidase, when from about 2 percent to about 5 percent, weight per volume, of Magnesol absorbent is added to the crude liquors and these liquors are maintained at a pH range from about pH 3.8 to about pH 4.5 during the course of the treatment. Lesser ratios of Magnesol absorbent do not usually remove all of the enzymes which detract from dextrose yields during enzymatic hydrolysis of starch and larger ratios may remove by simple mechanical absorption, appreciable amounts of the desired enzyme, amyloglucosidase. Preferred temperatures for treatment are from about 5° C. to about 30° C. and preferred treatment times are from about 30 to about 60 minutes.

Amyloglucosidase activity units are determined as follows: The substrate is a 15–18 D.E. acid hydrolyzate of corn starch dissolved in water and diluted to 4.0 grams of dry substance per 100 ml. of solution. Exactly 50 ml. of the solution is pipetted into a 100-ml. volumetric flask. To the flask is added 5.0 ml. of pH 4.3, 1.0 molar sodium acetate-acetic acid buffer. The flask is placed in a water bath at 60° C., and after 10 minutes, the proper amount of enzyme preparation is added. At exactly 120 minutes after addition of the enzyme preparation, the solution is adjusted to a phenolphthalein end-point with one normal sodium hydroxide. The solution is then cooled to room temperature, and diluted to volume. A reducing sugar value, calculated as dextrose, is determined on the diluted sample and on a control with no enzyme preparation added. Amyloglucosidase activity is calculated as follows:

$$A = \frac{S-B}{2 \times E}$$

where $A$ = amyloglucosidase activity units per ml. or per gram of enzyme preparation.
$S$ = reducing sugars in enzyme converted sample, grams per 100 ml.
$B$ = reducing sugars in control, grams per 100 ml.
$E$ = amount of enzyme preparation used, ml. or grams.

The reducing sugar concentration in the enzyme-converted sample should be not more than 1.0 gram per 100 ml.

All varieties of starch, or starch products and amylaceous materials may be used in my process employing amyloglucosidase hydrolysis. Preferably, however, for dextrose sugar production, a pure starch should be used and, preferably, for economic reasons, a pure starch which is already partially hydrolyzed or converted by some means so as to reduce the very high viscosity of the native starch when it is dispersed or dissolved in water. Reduction in viscosity facilitates the use of higher solids content of starch substance in the amyloglucosidase hydrolysis. Pretreatment of the starch may be made in any number of known ways, as by preliminary acid hydrolysis, pretreatment with a purified alpha-amylase which acts very much the same as acid on starch in the initial phases of the hydrolysis, at least, or pretreatment by physical means, such as forcing the paste through a Votator machine or homogenizer. The pretreatment may be a combination of two or more procedures as, for example, acid under pressure or using an alpha-amylase treatment combined with passage through a Votator machine. In any event, the pretreatment should be suitable to reduce the viscosity of substrate to a level so that workable fluids are obtained at a solids concentration of from between 25 to 50 percent, by weight, and, preferably, at a level of about 35 percent solids when the temperature of the liquor is in the range of about 45 to 60° C. However, this pretreatment should not be extended beyond the level above indicated or otherwise any undesirable features of the hydrolysis or conversion used in the preliminary treatment may superimpose upon the results obtained in the amyloglucosidase hydrolysis which follows.

Thus, for example, in a preferred embodiment of this invention, starch is converted with very dilute acid under pressure in the orthodox manner of making a starch syrup and the syrup at about 35 percent solids concentration is hydrolyzed to dextrose with purified amyloglucosidase. When the starch is so converted in comparatively thin dispersions to the level of about 10 to 20 D.E. (dextrose equivalent), the product may be made up for amyloglucosidase hydrolysis at the preferred concentration and hydrolyzates having a dextrose content in the exceptionally high range of 90 to 98 percent, dry basis, will be obtained. However, if the acid treatment is considerably more extensive, then, even though more concentrated solutions may be used, nevertheless, the amyloglucosidase hydrolysis will not appear to have been as complete because the acid has produced a certain amount of enzyme-resistant reversion products in the more extended phases of the acid treatment.

In any event, the starch substrate should be dispersed in water and the solution should be adjusted to an acidity level and temperature should be selected so that the amyloglucosidase may complete the hydrolysis in the shortest time and with the best economy in respect to the amount of enzyme used. Acidity and temperature are interdependent variables. Soda ash, sodium hydroxide, and the like are suitable alkaline materials and hydrochloric is a suitable acid for making these adjustments of the pH level of the liquors for amyloglucosidase hydrolysis.

The optimum temperature for hydrolysis with pure amyloglucosidase is within the range of 35 to about 60° C. although the optimum temperature is dependent upon the pH as is the case with many other enzymes. Conversely, the pH optimum range, which broadly is about 4 to 6.5 is dependent upon temperature. In general, optimal rates of hydrolysis for pure amyloglucosidase will be obtained in the lower pH range of 4 to 5 when the temperature employed is in the lower range of 35 to 45° C., and as the temperature is increased, optimal rates will be obtained by increasing the pH level accordingly.

In the hydrolysis of starch or starch products with amyloglucosidase to produce dextrose, a further limitation is imposed in regard to pH level and temperature because of the lessened stability of the product, dextrose, at higher pH levels and higher temperatures. Accordingly, in carrying out the teachings of this invention, the preferred operating ranges for hydrolysis with amyloglucosidase are a pH range of 4.0 to 4.8 and a temperature range of 45 to 60° C.

The length of time for the starch hydrolysis will depend upon several operating variables. Most important of these are ratio of amyloglucosidase to substrate, pretreatment of the starch, addition of assisting enzymes, the temperature and pH levels employed and the substrate concentration. However, and in any case, the hydrolysis may be followed in practice by analytical determinations well known in the art such as, for example, the method of Sichert-Bleyer for the determination of dextrose, and the hydrolysis is continued until by analysis it is apparent that the action of the amyloglucosidase has been substantially completed under the operating conditions chosen, that is, the concentration of dextrose in the hydrolyzate has reached an optimum. In general, a practical optimum will be when the soluble solids in the hydrolyzate are found by analysis to be 90 to 98 percent dextrose on a dry basis. The length of time required to arrive at this optimum will vary between about 10 and 90 hours, depending on operating variables, such as those above discussed. A convenient operating range of purified amyloglucosidase addition is from about 10 to about 20 amyloglucosidase activity units per 100 grams of starch substrate, or about 45 to 90 units per pound of starch.

Following the hydrolysis stage of the processes, the hydrolyzate is refined, concentrated, crystallized and centrifuged to recover the crystalline dextrose in pure form by use of equipment and general procedures well known in the glucose refining industry, taking into account that the hydrolyzates produced in accordance with this invention have lower concentrations of colored bodies, electrolytes and other impurities and correspondingly higher concentrations of dextrose and represent refined hydrolyzate liquors which crystallizes more readily and more completely than hydrolyzates of the prior art.

The invention will be further illustrated by the following examples which are typical and informative and not intended as limiting the invention.

EXAMPLE I

A sample of crude *A. niger* culture liquor was added to an aqueous solution of acid converted corn starch having a D.E. of 17 percent, dry basis, a pH of 4.0, and a solids content of 35 percent by weight. The ratio of crude culture liquor to hydrolyzate solids was 10 ml. per 100 grams. Each ml. contained 1.5 amyloglucosidase activity units. The enzymatic hydrolysis was allowed to proceed for 72 hours at 60° C. The liquor was then filtered and analyzed. Results are presented in Table I.

Another sample of the aforementioned crude *A. niger* culture liquor was treated by adding thereto a synthetic, water-insoluble magnesium silicate sold under the trademark Magnesol by the Westvaco Chlor-Alkali Division of the Food and Machinery Chemical Corporation. The absorbent was added at the ratio of 4 grams per 100 ml. with sufficient hydrochloric acid to maintain a pH of 4.0 to 4.5 during treatment. The mixture was stirred at room temperature for about an hour and filtered.

The filtrate was added to a sample of the aforementioned starch hydrolyzate at the ratio of 10 ml. of filtrate to 100 grams of hydrolyzate solids. Each ml. contained 1.5 amyloglucosidase activity units. The hydrolysis was allowed to proceed for 72 hours at 60° C. The liquor was then filtered and analyzed. Results are presented in Table I.

TABLE I

| Hydrolyzate Derived by Action of | Conc. of Solids in Hydrolyzates as Percent By Weight | Optical [1] Density At λ=390 mμ | D. E.,[2] Percent Dry Basis | Actual [3] Dextrose, Percent Dry Basis |
|---|---|---|---|---|
| Crude *A. niger* liquor | 35.56 | 0.208 | 90.2 | 84.0 |
| Crude *A. niger* liquor plus absorbent treatment | 35.50 | 0.126 | 95.2 | 92.7 |

[1] Using a Coleman Model 14 spectrophotometer.
[2] By the Lane-Eynon modified Fehling's test.
[3] By the Smogyi yeast fermentation method.

It is to be noted that there was an increase of 8.7 percent more dextrose in the hydrolyzate solids when the crude culture liquor was treated in accordance with the present invention to remove substances detrimental to the dextrose yield and to remove enzymes which produce sugars other than dextrose. That far more non-dextrose sugars were produced by the crude fungal liquor is apparent by comparing the values for total sugars found under D.E., with the values for actual dextrose content. In the case of the hydrolyzate produced by the crude fungal liquor, there was produced 6.2 percent of non-dextrose sugars while in the case of the hydrolyzate produced by the treated fungal liquor only 2.5 percent of non-dextrose sugars was produced. Thus, there was nearly 4 percent more non-dextrose sugars made in the hydrolyzate from the crude fungal liquor. The additional gain in dextrose yield over this 4 percent of non-dextrose sugars, up to 8.7 percent more dextrose conversion with the purified amyloglucosidase, can be explained by the removal by the treatment of the extraneous protein and other materials which interact with carbohydrate during hydrolysis. Optical density values in Table I show that color of the starch hydrolyzate was reduced 40 percent by using the purified enzyme.

EXAMPLE II

*Chromatographic analyses of hydrolyzates*

Hydrolyzate samples from Example I taken at different times during enzymatic conversion were inspected by paper chromatography. In each case, 0.025 ml. portions of samples made up to 12 percent solids concentration were placed on the paper, the paper dried and the chromatogram developed with a solvent mixture consisting of 3 parts butanol, 5 parts propanol and 2 parts water, all parts by volume. After an interval during which the dextrose fraction traveled about 400 mm. from the origin, the papers were dried and then sprayed with an acetone solution of aniline, diphenylamine and phosphoric acid. The original acid hydrolyzed starch syrup, alone, and this syrup containing added isomaltose and panose were also chromatographed as controls to give reference points for known saccharides. During the time allowed, maltose traveled about 190 mm.; isomaltose, 150 mm.; trisaccharides, about 80–90 mm.; tetrasaccharides, 40 mm. and pentasaccharides, 15 mm. All of these spots could be readily seen in the control chromatograms, distinct and well separated from each other.

When hydrolyzate samples were inspected from Example I, wherein only the crude *A. niger* culture filtrate was used to hydrolyze the acid hydrolyzed starch syrup, the hydrolyzate was seen to consist largely of dextrose. However, there was a pronounced spot for the synthetic trisaccharide panose, weaker spots for maltose and isomaltose and still weaker spots for tetra- and pentasaccharides, all at 24 hours' hydrolysis time at 60° C. All of these spots, excepting for dextrose and isomaltose became weaker after 72 hours' hydrolysis time, although the spot for the synthetic trisaccharide, panose was still relatively strong.

Isomaltose is known to be a normal product of hydrolysis of starch, even when the starch is hydrolyzed by acid and even when the acid hydrolysis is carried out under conditions least favorable to the formation of isomaltose by recombination of two dextrose molecules (see Wolfrom et al., J. Am. Chem. Soc., 73, 4927 (1951)).

Panose present in starch hydrolyzates results largely from synthesis by joining maltose to dextrose with a 1-6, alpha glucoside linkage by means of the enzyme transglucosidase (see Pan et al., Science 112, 115 (1950) and J. Am. Chem. Soc., 73, 4093 (1951)).

When hydrolyzates were examined which had been made with amyloglucosidase purified by treating *A. niger* culture liquor with Magnesol, then at the end of 24 hours' enzyme conversion there was present about the same amount of trisaccharides and maltose as was seen in the control not hydrolyzed by enzyme, more isomaltose and very much more dextrose. At the end of 72 hours' enzyme conversion, the hydrolyzate was nearly all dextrose, with a trace of isomaltose and only the faintest traces of maltose and panose. There were not sufficient amounts of higher saccharides to show on the chromatogram.

These results prove that the Magnesol treatment of the *A. niger* extract effectively removed transglucosidase so that it did not detract from the dextrose yield by synthesizing sugars such as panose. The results show further that after treatment of the *A. niger* culture liquor with Magnesol, the resulting purified enzyme preparation now exhibited substantially only the starch hydrolyzing activity that is ascribed to the pure enzyme, amyloglucosidase. This is, the endwise attack on each starch molecule (or acid hydrolyzed starch molecule) splitting off only dextrose units from molecule terminals, until hydrolysis is virtually completed.

EXAMPLE III

Starch which had been washed with water, had been made up to 10° Bé. with water and adjusted to approximately 0.02 normal acid with hydrochloric acid, is converted in an autoclave at 20 p.s.i. steam pressure until the conversion liquor is approximately 17 D.E., that is, the reducing value of the dissolved solids in the liquor, as measured by a modified Fehling's test (Fetzer, W. J., Analytical Chem. 24, 1129–1137 (1952) references Nos. 37 to 41) and the results calculated as dextrose, is 17 percent, dry basis. The starch syrup liquors are then treated with about 0.5 percent, dry basis, bentonite and filtered on a filter precoated with Dicalite filter aid. The liquors are adjusted to pH 4.5 by adding soda ash and concentrated by evaporation under reduced pressure to approximately 35 percent dry substance. The liquors are now adjusted to about pH 4.0 to 4.2 at 60° C. and for each pound of dry substance present, 90 activity units of a purified amyloglucosidase preparation are added.

The amyloglucosidase was purified by treating an *A. niger* culture extract with Magnesol absorbent in a manner as set forth in Example I, paragraph 2. Enzymatic hydrolysis is allowed to proceed at 60° C. for 72 hours at which time maximal values of approximately 95 to 96 for D.E. and approximately 93 percent, dry basis, for true dextrose by the Smogyi yeast fermentation method, are obtained.

The converted liquors are treated with about 1 percent carbon, filtered, and evaporated to about 70 to 75 percent dry substance content before passing to the crystallizer. Because of the higher purity of these liquors, compared to crystallizer liquors from prior art processes, the dextrose tends to crystallize much more readily, which characteristic necessitates the use of a slightly less concentrated liquor than is commonly used in orthodox dextrose crystallization procedures. An initial temperature of 42° C. is employed in the crystallizer, with the usual addition of dextrose seed crystals, and the liquors are cooled with stirring over a period of two days to about 16 to 18° C. The liquors are then centrifuged to recover the dextrose crystals and the liquors are additionally crystallized by evaporation to about 75 to 80 percent dry substance content and stirring, while cooling over a temperature range of from 42 to 18° C. during a 4-day period.

Yields of very high purity, first grade crystalline dextrose of approximately 85 percent result from this process, deduction being made of the seed crystal dextrose added in the crystallization of the concentrated hydrolyzate. This yield is approximately 20 percent more dextrose than is obtained from starch by orthodox, acid conversion processes, using a single stage acid conversion and comparable refining procedures, and 5 to 10 percent or more yield of dextrose than is obtained in enzyme conversion processes of the prior art using a single stage enzymic conversion of acid hydrolyzed starch, comparable refining procedures and a comparable double stage crystallization procedure.

I claim:
1. In a process for producing dextrose from starch wherein the starch in aqueous system is hydrolyzed with an amyloglucosidase containing enzyme preparation to maximal D.E. and true dextrose contents, the hydrolyzate is clarified, concentrated by evaporation, and allowed to crystallize, and the crystallized dextrose is separated from the mother liquor, the improvement which consists in hydrolyzing the starch with an amyloglucosidase containing enzyme preparation which has been purified by treating an aqueous solution of said preparation with about 2 to about 5 percent of a water insoluble hydrous synthetic magnesium silicate, at a pH of about 3.8 to about 4.5, the mixture centrifuged and the liquid phase containing the amyloglucosidase is recovered; said hydrolysis resulting in a final hydrolyzate which has maximal D.E. values of about 95 to 96 percent and maximal true dextrose contents of about 93 to 94 percent, dry basis.

2. A process for purifying an amyloglucosidase enzyme containing preparation which comprises treating an aqueous solution of said preparation with about 2 to about 5 percent of a water insoluble hydrous synthetic magnesium silicate, at a pH of about 3.8 to about 4.5, the mixture centrifuged and the liquid phase containing the amyloglucosidase is recovered.

3. In a process for producing dextrose from starch wherein the starch in aqueous system is hydrolyzed with an amyloglucosidase containing enzyme preparation to maximal D.E. and true dextrose contents, the hydrolyzate is clarified, concentrated by evaporation and allowed to crystallize and the crystallized dextrose is separated from the mother liquor, the improvement which consists in hydrolyzing the starch with an amyloglucosidase containing enzyme preparation from which transglucosidase enzyme has been separated and removed by means of adding to a water solution of crude amyloglucosidase about 2 to about 5 percent of a water-insoluble hydrous synthetic magnesium silicate at a pH of about 3.8 to 4.5, separating and discarding the insoluble phase that contains the transglucosidase leaving a purified solution of the amyloglucosidase substantially free of transglucosidase and using said amyloglucosidase in said hydrolysis of starch, thereby obtaining a final hydrolyzate which has maximal D.E. values of no less than about 93 to 96 percent and maximal true dextrose content of no less than about 94 percent.

References Cited in the file of this patent

UNITED STATES PATENTS

| | | |
|---|---|---|
| 2,121,459 | Leitz et al. | June 21, 1938 |
| 2,567,000 | Wallerstein et al. | Sept. 4, 1951 |
| 2,717,852 | Stone | Sept. 13, 1955 |
| 2,881,115 | Liggett et al. | Apr. 7, 1959 |
| 2,893,921 | Langlois et al. | July 7, 1959 |

OTHER REFERENCES

Cereal Chemistry, March 1949, pp. 98–109.
"The Enzymes," by Sumner et al., Academic Press Inc., New York (1950), vol. 1, Part 1, page 702.